E. M. KNIGHT.
FILTER.
APPLICATION FILED NOV. 12, 1909.
983,625.
Patented Feb. 7, 1911.
2 SHEETS—SHEET 1.
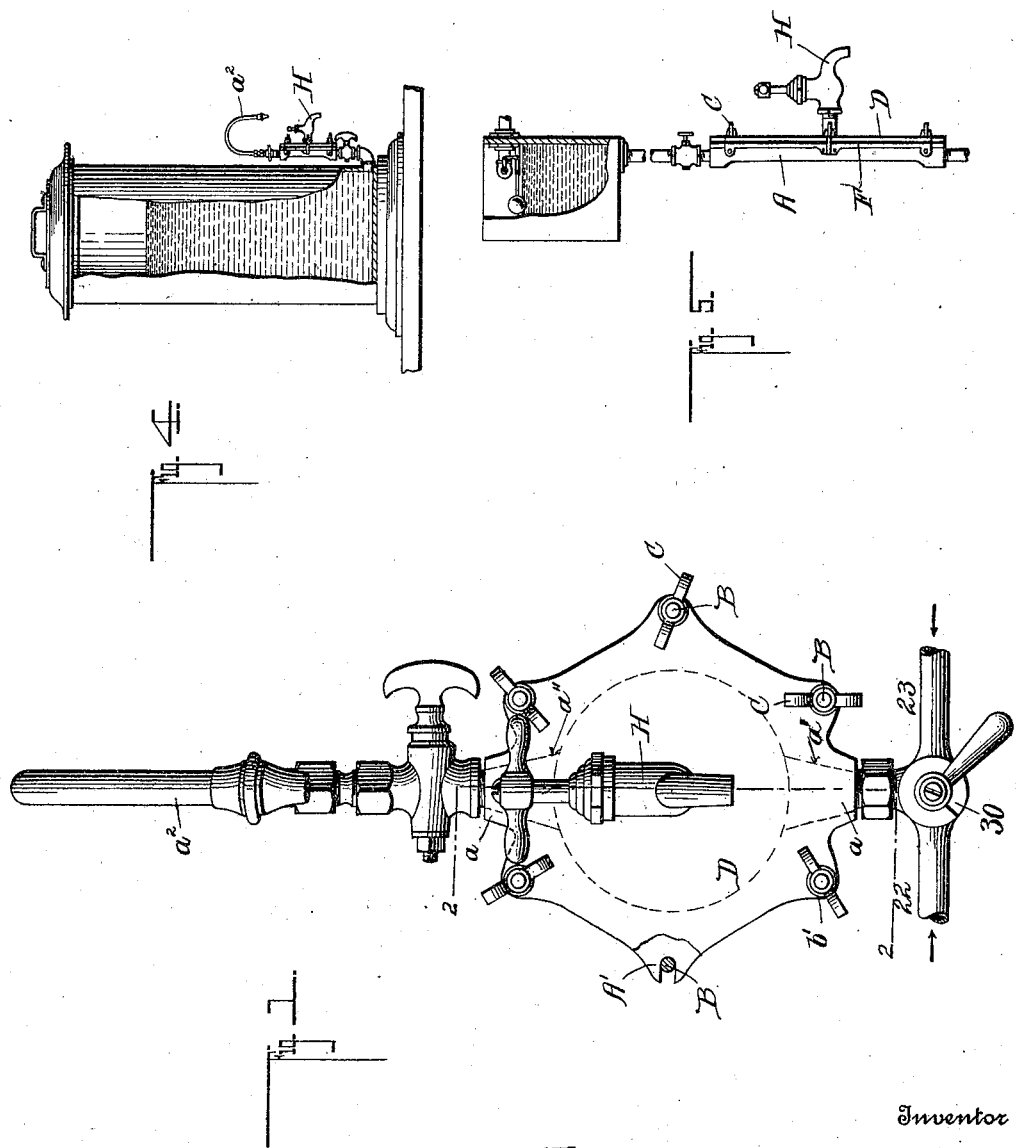
Witnesses
Philip H. Burch
E. G. Gibbs
Inventor
Edward M. Knight
By T. Walter Fowler
Attorney

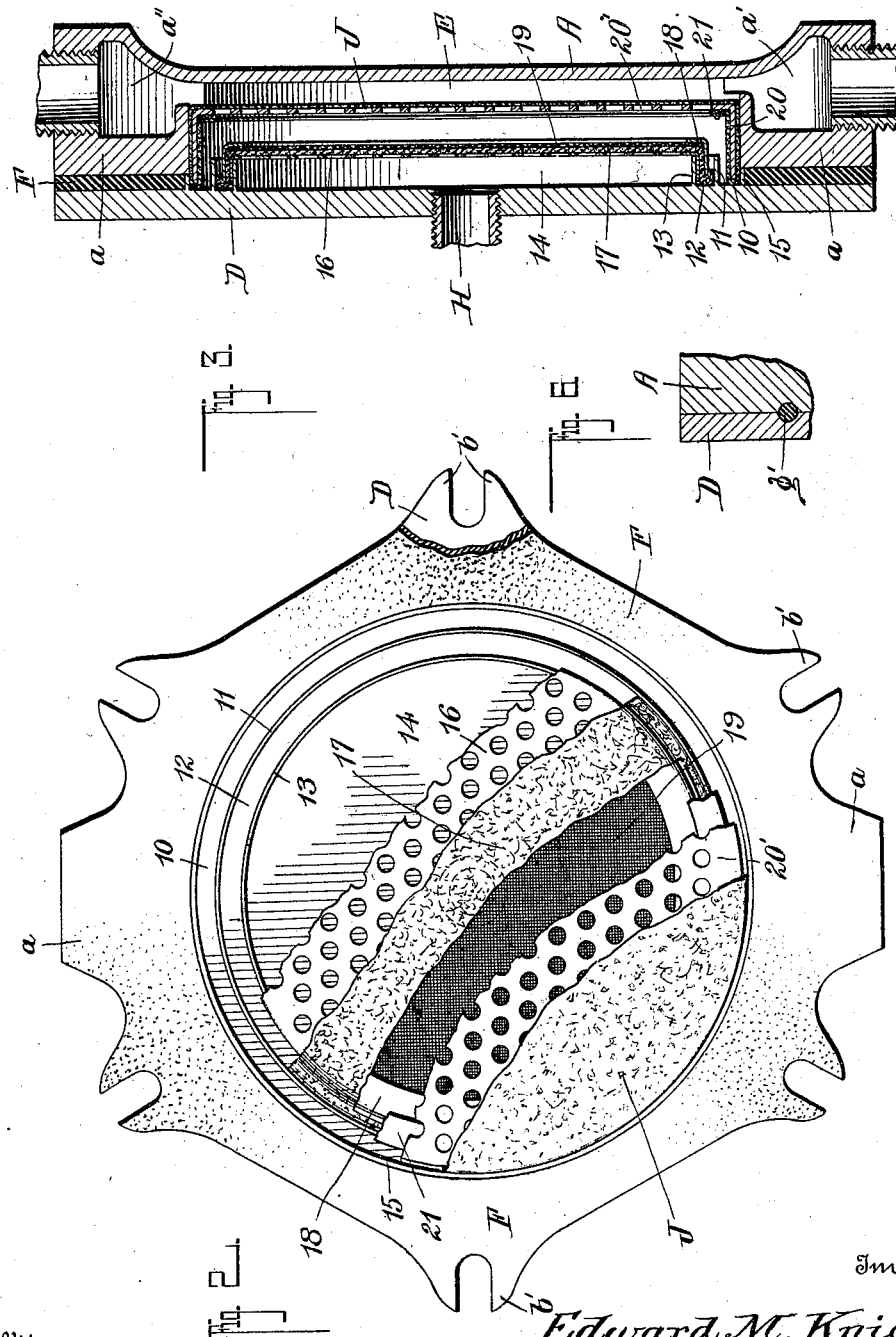

UNITED STATES PATENT OFFICE.

EDWARD M. KNIGHT, OF NEW YORK, N. Y.

FILTER.

983,625.  Specification of Letters Patent.  Patented Feb. 7, 1911.

Application filed November 12, 1909. Serial No. 527,671.

*To all whom it may concern:*

Be it known that I, EDWARD M. KNIGHT, a citizen of the United States, residing at New York, in the borough of Manhattan and State of New York, have invented certain new and useful Improvements in Filters, of which the following is a specification.

This invention relates generally to a means for purifying liquids, by eliminating therefrom the contained impurities; it is particularly useful in the filtration of water for domestic purposes and wherein the water delivered from the main is caused to pass through a filtering medium or media of either a solidified or porous character.

In the working of the invention I prefer to use a filter bed composed of asbestos as I have found that this substance gives the best results in the purification of water; at the same time this material provides for a more rapid discharge of filtered water than I have been able to obtain when using a more solid or impervious filtering medium.

The essential object of the present invention is to facilitate the renewal of the filter bed and cleansing of the filter without detaching the filter body from its fixed position, or its permanent connection with the service pipes or other source of fluid supply, and to this end I construct the present filter with a removable cover to which is removably attached the filter bed whereby when the cover is removed the filter bed is removed with it and is directly accessible so that it may be renewed and the filter cleansed rapidly and with little trouble, it being understood that in thus removing the cover the supply of fluid is temporarily cut off by the manipulation of a suitable cock or cut-off valve arranged in the service pipe.

With the above and other objects in view, my invention consists of the parts and constructions and combinations of parts which I will hereinafter describe and claim.

In the accompanying drawings forming a part of this specification and in which similar reference characters indicate like parts in the several views:—Figure 1 is a front elevation of a filter embodying the salient features of my invention, parts of the filter being broken away to expose the internal construction. Fig. 2 is a plan view of the inside of the cover detached with parts broken away. Fig. 3 is a vertical sectional view on the line 2—2 of Fig. 1. Fig. 4 shows the application of my invention to a water cooler. Fig. 5 shows the use of the invention in connection with an elevated tank containing liquid to be filtered. Fig. 6 is a modification to be referred to.

In carrying out my invention I construct the filter with a suitable base or frame, A, which may be of any suitable design and configuration. For matter of convenience and as disclosing an attractive form of filter, I have shown the frame as being substantially circular and of somewhat shallow depth, said frame having a peripheral flange with outstanding bifurcated lugs, A', in which are pivotally mounted bolts, B, with wing-nuts, C, by which the cover, D, may be detachably and tightly secured to the base or frame. The base or frame also is provided with enlargements, $a$, $a$, both of which are provided with water passages one of which $a'$, connects with the supply of unfiltered water and the other, $a''$, is an outlet leading unfiltered water outside of the screen and through a suitable valve-controlled goose neck, $a^2$, or other form of discharge faucet. In practice the inlet passage, $a'$, diverges inwardly and the outlet passage $a''$ converges outwardly in order that the surfaces of the filter bed may be the better flushed and washed automatically by the current of water flowing through the inlet and across the outer surface of the filter bed, the fan shaped form which is thus given the water on entering the frame facilitating the cleansing action of the water upon the filter bed. That this result may be obtained in the most satisfactory manner, it is preferred to locate the inlet and outlet water passages at diametrical sides of the annular chamber, E, formed within the base or frame and close to the back wall of this chamber, but other arrangement of these passages may be adopted without departing from the salient features of the present invention.

The leading characteristic of my present invention is in the construction of the cover plate, D, and the means whereby it is made to support and carry the filter bed proper. In practice this cover plate conforms to the general outline of the base or frame, therefore, it is shown in the present drawings as having bifurcated lugs $b'$, around its periphery adapted to register with the corresponding lugs around the periphery of the base or frame, the bifurcations in the lugs being adapted to receive the locking bolts, B, which may be turned upwardly into said bifurcations and the cover plate securely locked to the flange of the base or frame by screwing the wing-nuts, C, down tightly upon the cover plate. That a water tight joint may be formed between the flange of the base or frame and the cover plate, I insert between these parts a suitable gasket, F, which may be in the form of a flat sheet of rubber or other material suitable for packing purposes; if desired the round or other ring $g'$, may be let into a groove (Fig. 6) formed in the flange of the base or frame and the cover plate may be clamped tightly against this ring to provide against the leakage of water. It will also be observed that the central portion of the cover plate is pierced with an opening in which is secured or otherwise fitted a cock or faucet, H, through which filtered water may be drawn when desired.

Referring to Fig. 2 where the construction of the cover plate is shown in detail it will be observed that this cover plate has its inner face constructed with an annular groove or channel, 10, the inner wall of which is formed by an annular flange, 11, and that a second annular groove or channel, 12, is formed between the inner wall of the flange, 11, and an outer wall of another and concentric flange, 13; the inner wall of said latter flange circumscribes and incloses a chamber, 14, which is the filtered water chamber and from which leads the draw-off cock or faucet, H, before mentioned. The cover plate and the various flanges just mentioned, together with a flange, 15, which circumscribes the groove or channel, 10, and against whose outer wall the packing ring or gasket, F, is fitted, are formed as a rigid substantially integral structure which may be made cheaply and without danger of any of the parts becoming loose and permitting the leakage of unfiltered water.

A foraminous plate, 16, of any suitable material has a surrouding rim or flange which snugly fits over the flange, 13, projecting from the inner face of the cover plate, said foraminous plate being readily removable and being frictionally held by reason of its close fit with the flange, 13, so that the parts will be retained together in removing the cover plate from the frame or base. The foraminous plate forms a backing for the filtering medium, 17, which may be of any desired character, but is preferably composed in whole or in part of asbestos fibers suitably interlocked to form a bed which will permit of the rapid percolation of liquid and yet will resist the passage of sedimentary matter or other impurities carried by the liquid. A filter bed in the form of a pad or film such as is described and claimed in my copending application, Serial Number 523,959, filed Oct. 22, 1909, or one where the bed is composed entirely of comminuted fibrous material as asbestos, may be used and will be found of superior advantage in a filter of this character. This filter bed in practice has a diameter somewhat larger than that of the flange, 13, and when it is placed over the foraminous plate or sheet, 16, its edge extends beyond the flange, 13, which is necessary because this edge is designed to be forced into the annular groove or channel formed between the flanges 11 and 13 and this may be readily done by the annular rim, 18, which is fixed to and removable with a fine screen plate, 19, of woven or other suitable material, which not only thus secures the fibrous bed in position on the back of the cover plate, but it also serves to protect the fibrous bed from the disintegrating action or force of the water acting directly against the bed and disturbing the fibers thereof and opening up crevices which would tend to the escape of unfiltered water through the bed. It will be understood, however, that the screen plate is of such character that it will not impede the rapid flow of water through it to the filter bed. This screen plate when its flange is fitted over the annular flange, 13, on the back of the cover plate forces the edge of the fibrous bed into the annular groove or channel, 12, and is itself locked to said flange and the inturned portion of the filter bed by the frictional engagement of the parts, and yet the screen plate may be readily lifted from the bed to give access to the latter when occasion makes this necessary or advisable.

Over the screen plate, 19, is fitted a removable cap, J, which consists of a surrounding rim or flange, 20, and a foraminous or other perforated plate, 20', said plate and rim being covered by a woven fabric, as asbestos, the edge of which is turned over the edge of the rim, 20, and is secured by a metal or other ring, 21, on the inside of the cap. When thus constructed the cap has a diameter about equal to the diameter of the outermost flange, 15, formed on the inner face of the cover plate of the filter, therefore, in fitting the cap over the screen plate, the fabric-covered rim of the cover closely and frictionally enters the annular groove or channel 10 formed in the inner surface of the cover plate and thus covers and protects the entire filter bed and the parts with which it is directly associated. The outer surface of the fabric-covered sheet forms the inner wall of the unfiltered water chamber, E, of the base or frame and water entering this chamber direct from the main or from any other source of supply will, if the controlling cock leading from the unfiltered water outlet is closed, pass through the fabric-covered cap and through the underlying screen-plate and the fibrous or other filter bed and into the filtered water chamber in the cover plate and may be drawn as filtered water through the faucet. If unfiltered water is desired for cooking or other domestic purposes, the cock or valve in the outlet pipe leading to the goose-neck, $a^2$, may be opened in which case the unfiltered water enters through the inlet $a'$ of the frame or base and passes straight across the face of the fabric covered cap and in its progress thereacross flushes and removes from the surface of this cap any sedimentary matter which may have collected thereon, thus cleansing the cap and providing for the removal of collected impurities through the goose-neck or other final discharge. In Fig. 1 I show the connections as including a suitable valve, 30, at the junction of a hot-water pipe, 22, and cold-water pipe, 23, each of which may be of any conventional form and provided with the necessary fittings for pipes of this character. Such an arrangement allows for the filtration of either hot or cold water by the manipulation of the valve, 30, which may be of any well known type suitable for connecting first one and then the other of the supply pipes with the inlet passage to the filter. My invention is, however, not restricted to any particular mounting or place of using the filter, for in Fig. 4 I show the filter as connected with the outlet of a water cooler, while in Fig. 5, I show the filter associated with an elevated tank of conventional form containing liquid to be purified.

Whatever the intended use of this filter and the character of the associated fluid supply, the filter-bed and the fabric-covered cap, J, are so connected with the cover plate and so held thereto that when the cover-plate is removed by the loosening and turning back of the locking-bolts or whatever fastenings may be used, said plate and its attached parts may be bodily removed without disturbing the position of the body or frame, A, or in any manner disconnecting the fittings except cutting off the supply through the cock or valve 30. This is important because it permits the removal of the filter-bed intact with the cover-plate and thus gives ready access to the bed and permits the fabric-covered cap to be removed and then the underlying screen-plate lifted from the fibrous bed and the bed removed and replaced by a new bed, with but little difficulty and with the expenditure of but little time, after which the cover plate with its attached filter-bed and associated parts may be quickly fitted to the base or frame and locked thereto in operative position before described.

While I have described the filter as intended primarily for the filtration of water it will be understood that it may be used for the filtration of any liquid where it is desired to separate the fluid contents from associated impurities.

Having thus described my invention what I claim as new and desire to secure by Letters Patent is:

1. In a filtering device, the combination with the base member having an inlet and outlet, a fibrous filtering medium extending across the base member and arranged in the direct line of the flow of water from said inlet to the outlet whereby the surface of the filtering medium is washed by the withdrawal of each charge of the unfiltered water passing through the outlet, and a cover-plate having means for confining the edges of the filtering medium and being detachably connected to said base member, and having a faucet connecting with the filtered water space of the filter, said filtering medium being attached to and positively removable and replaceable with the cover-plate.

2. In a filtering device, the combination with a base member having an inlet and outlet, of a hollow filter having a fibrous filtering medium arranged in a plane which substantially coincides with that of said inlet and outlet whereby the outer surface of the filtering medium is exposed to the washing action of the flow of the unfiltered water through the outlet, and a flat cover plate carrying the hollow filter and having a faucet connecting with the interior filtered water space of the filter, said hollow filter being attached to and positively removed with the cover-plate.

3. In a filter, the combination with a base member adapted for permanent connection with a source of supply to be filtered, and having an inlet and outlet therefor; of a cover member for the base removably attached thereto, and having its inner face provided with a plurality of concentric flanges projecting beyond the plane of the inner face of the cover member, and a filtering medium removably secured in the spaces between the flanges and removable with the cover member whereby the filter may be cleaned and renewed without disturbing the permanent connection of the base member.

4. In a filter, the combination of a base member adapted for permanent connection with a source of liquid supply said member having an unfiltered liquid inlet and outlet, a cover member detachably fitted to the outer face of the base member, said cover member having its inner face provided with a plurality of concentric flanges and intermediate channels, a filter bed composed of filtering medium and layers of foraminous material on the inner and outer sides thereof, said layers having flanged rims to fit over certain of the flanges on the inner face of the cover plate, and one of said rims adapted to compress the edge of the filtering medium into one of said channels.

5. In a filter, the combination of a base member adapted for permanent connection with a source of liquid supply, said member having an unfiltered liquid inlet and outlet, a cover member detachably fitted to the outer face of the base member, said cover member having its inner face provided with a plurality of concentric flanges and intermediate channels, a filter bed composed of filtering medium and layers of foraminous material on the inner and outer sides thereof, said layers having flanged rims to fit over certain of the flanges on the inner face of the cover plate, one of said rims adapted to compress the edge of the filtering medium into one of said channels, the innermost of the flanges inclosing a chamber for the filtered liquid, and a faucet on the outside of the cover plate connecting with said chamber.

6. In a filter the combination of a base member having an inlet and outlet; a cover plate and means detachably connecting it with the base member, a filter bed carried by the cover plate and removable therewith, a removable cap fitted over the filter bed and having its outer face substantially parallel with and in the path of the flow of unfiltered liquid whereby the face of the cap is automatically flushed and cleansed by the passage of unfiltered liquid in traversing the base member from the inlet to the outlet thereof, said cap comprising a foraminous plate, a flanged rim therefor, and an outer woven fabric sheet.

In testimony whereof I affix my signature in presence of two witnesses.

EDWARD M. KNIGHT.

Witnesses:
T. W. FOWLER,
C. W. FOWLER.